(12) United States Patent
Kalsi et al.

(10) Patent No.: US 6,209,418 B1
(45) Date of Patent: Apr. 3, 2001

(54) MECHANICAL KICKDOWN FOR ELECTRONIC THROTTLE CONTROL PEDAL ASSEMBLY

(75) Inventors: Avtar S. Kalsi, Windsor (CA); Douglas J. Wheeler, Farmington Hills, MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/383,839

(22) Filed: Aug. 26, 1999

(51) Int. Cl.$^7$ ............................. G05G 1/14; F02O 11/10
(52) U.S. Cl. ......................... 74/513; 74/560; 74/514; 123/399
(58) Field of Search ........................... 74/513, 514, 560; 123/399

(56) References Cited

U.S. PATENT DOCUMENTS

| | | |
|---|---|---|
| Re. 34,302 | 7/1993 | Imoehl . |
| Re. 345,774 | 4/1994 | Imoehl . |
| 3,872,739 | 3/1975 | Hudson et al. . |
| 4,651,595 | 3/1987 | Miyawaki . |
| 4,944,269 | 7/1990 | Imoehl . |
| 4,958,607 | 9/1990 | Lundberg . |
| 4,976,166 | 12/1990 | Davis et al. . |
| 5,044,223 | 9/1991 | Mizuma et al. . |
| 5,051,550 | 9/1991 | Harris . |
| 5,088,343 | 2/1992 | Yokoyama . |
| 5,133,225 | 7/1992 | Lundberg et al. . |
| 5,188,001 | 2/1993 | Sukeshita et al. . |
| 5,214,979 | 6/1993 | Crack . |
| 5,233,882 | 8/1993 | Byram et al. . |
| 5,237,891 | 8/1993 | Neubauer et al. . |
| 5,241,936 | 9/1993 | Byler et al. . |
| 5,335,563 | 8/1994 | Yamamoto et al. . |
| 5,385,068 | 1/1995 | White et al. . |
| 5,408,899 * | 4/1995 | Stewart ................. 74/513 |
| 5,415,144 * | 5/1995 | Hardin et al. ............. 123/399 |
| 5,507,201 | 4/1996 | Fairbairn et al. . |
| 5,535,642 | 7/1996 | Moll . |
| 5,555,774 | 9/1996 | Lauring et al. . |
| 5,697,253 | 12/1997 | Papenhagen et al. . |
| 5,769,754 | 6/1998 | Kil . |
| 5,806,376 | 9/1998 | Papenhagen et al. . |
| 5,868,040 * | 2/1999 | Papenhagen et al. ............ 74/513 |
| 5,934,152 * | 8/1999 | Aschoff et al. ............ 74/513 |
| 6,098,971 * | 8/2000 | Stege et al. ............ 267/251 |
| 6,109,241 * | 8/2000 | Engelgau ............. 123/399 |

\* cited by examiner

*Primary Examiner*—Richard M. Lorence
(74) *Attorney, Agent, or Firm*—Howard & Howard

(57) ABSTRACT

An accelerator pedal assembly (12) for electronically controlling a vehicle engine throttle includes a housing (18), a pedal arm (16) pivotally supported with respect to the housing (18), and a pedal pad (14) connected to a lower end (20) of the pedal arm (16). The pedal arm (16) is pivotable between an idle position and a maximum applied position as a pedal force is applied to the pedal pad (14). Under certain conditions, the accelerator pedal arm (16) can be pivoted to a position that causes the automatic transmission (40) to kickdown by changing to a next lower gear. Under these conditions a feel is imparted to the driver's foot indicating that a downshift has occurred. To simulate this feel in a drive-by-wire application, the pedal arm (16) presents a cam surface (48) for interacting with a spring (50) that has a first end (52) seated within the housing (18) and a movable second end (54) for bias engagement with the pedal arm (16). The spring (50) includes a roller (60) mounted on the second end (54) that is forced into contact with a lobe (74) on the cam surface (48) when the pedal arm (16) is pivoted from a first operable position to a pre-determined kickdown position. As the roller (60) engages the lobe (74), the pedal force required to further pivot the pedal arm (16) is increased imparting a kickdown feel to the driver via the pedal pad (14).

20 Claims, 5 Drawing Sheets

MECHANICAL KICKDOWN FOR ELECTRONIC THROTTLE CONTROL PEDAL ASSEMBLY

TECHNICAL FIELD

The subject invention relates generally to electronic throttle control device for a vehicle pedal assembly. Specifically, the electronic throttle control includes a resilient member interacting between the housing and a pedal portion to generate a kickdown feel of a vehicle downshift at the pedal pad.

BACKGROUND OF THE INVENTION

The invention relates to foot pedal devices for controlling engines without the need for a direct mechanical connection between the pedals and the engines. The invention is particularly directed to providing a drive-by-wire system, i.e., driving by electrical or electronic means, rather than by mechanical links.

In the prior art, accelerator pedals are used to mechanically control a vehicle engine and usually include a pedal mounted to a vehicle body with a series of links and levers, or Bowden cables, connecting the pedal to the carburetor, fuel injector, controller, or other similar device. These linkages must be designed to withstand and accommodate engine movements relative to the vehicle frame, as well as to provide accurate control despite such movements. In addition, packaging space must be provided for the linkages to function properly. The space available for routing the mechanical control links, rods, and cables is limited. When electrical sensors are used to monitor the position of the pedal, connection to the carburetor or other engine device can be accomplished with electrical wiring, which is more easily routed through the vehicle.

In drive-by-wire applications, it is important that the pedal system provide the customary feel and performance of a mechanical linkage. The pedals must function responsively to driver input and must provide non-fatiguing resistance. Drivers are accustomed to applying and releasing pressure on a pedal arrangement and become accustomed to the resistance to application of force to the pedal as well as to the rate of withdrawal as the applied pressure is relaxed. With the present invention, the customary feel during the application of force to increase speed and while maintaining speed, as well as the familiar deceleration movement of the pedal can be duplicated in a wire type control.

The accelerator pedal is connected to a potentiometer or other sensor that is used to monitor the position of the pedal with respect to a reference point. The potentiometer generates a signal that varies in magnitude with respect to the pivotal position of the accelerator pedal. This signal is sent to a computer processor that is wired to the potentiometer. The processor uses the sensor signal along with various other parameters to generate a control signal for controlling the position of the engine throttle through a wire connection.

The accelerator pedal is operable between an idle position and a maximum travel position. When a force is applied to the pedal, the pedal pivots to an operating position somewhere between the idle and maximum travel positions. Sometimes the driver will desire a fast acceleration, which will cause the automatic transmission to change to a next lower gear. In a mechanical linkage, when the transmission makes this downshift, a certain feel is imparted to the driver's foot via the pedal assembly. This feel is referred to as kickdown. An example of a kickdown mechanism that is used to initiate a transmission downshift for a pedal that is mechanically linked to an engine throttle is shown in U.S. Pat. No. 5,697,253. With the present invention, the customary feel during the downshift can be duplicated in a wire type control such that the driver can feel the kickdown at the pedal.

An example of an electrical kickdown switch used in an electronic throttle control pedal assembly to initiate a transmission downshift is shown in U.S. Pat. No. 5,806,376. However, these electronic control pedal assemblies do not include a mechanical mechanism for imparting the kickdown feel to a driver. The present invention provides an electronic throttle control pedal assembly with a kickdown generating mechanism that imparts a transmission shift feel to the driver. The kickdown generating mechanism requires few components, is easy to maintain, and is easily assembled into an electronic throttle control pedal.

SUMMARY OF THE INVENTION AND ADVANTAGES

An accelerator pedal assembly for electronically controlling a vehicle engine throttle includes a housing for attachment to a vehicle structure and a pedal arm with an upper end pivotally supported with respect to the housing and a lower end for supporting a pedal pad. The pedal arm is pivotable between a plurality of operable positions as a pedal force is applied to the pedal pad. The pedal arm presents a cam surface for interacting with a resilient member that has a first end fixed relative to the pedal arm and a movable second end for bias engagement with the pedal arm. The resilient member is forced into contact with a portion of the cam surface when the pedal arm is pivoted from a first operable position to a predetermined second operable position such that the pedal force required to further pivot the pedal arm is increased.

The vehicle engine is operably connected to a transmission that is shiftable between a plurality of high and low gear positions as the pedal arm is pivoted between operable positions. Preferably, the second operable position is defined as a kickdown position where the transmission shifts from a high gear position to a low gear position under certain pre-defined conditions. In the preferred embodiment, the pedal arm is pivoted from an idle position to the first operable position when a first pedal force is applied to the pedal pad; the pedal arm is pivoted from the first operable position to the kickdown position when a second pedal force is applied to the pad; and the pedal arm is pivoted from the kickdown position to a maximum applied position when a third pedal force is applied to the pedal pad. The second pedal force is greater than the first or third pedal force, which imparts a downshift feel to a driver via the pedal pad. It should also be understood that the pedal could be configured to only require two pedal forces as compared to three pedal forces.

Also in the preferred embodiment, the resilient member is comprised of a spring having one end seated within the housing and an opposite end connected to a roller for engaging the cam surface as the pedal arm is moved from an idle position to a maximum applied position. The cam surface is preferably comprised of a first portion, a central portion having a lobe extending outwardly from the surface, and a second portion. The roller engages the first portion when the pedal arm is pivoted from the idle position to the first operable position, engages the lobe when the pedal arm is in the kickdown position, and engages the second portion when the pedal arm is pivoted from the kickdown position to the maximum applied position. Thus, the second pedal force is increased as the roller is forced over the lobe to simulate a transmission shift feel at the pedal pad as the transmission shifts from a high gear position to a low gear position.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
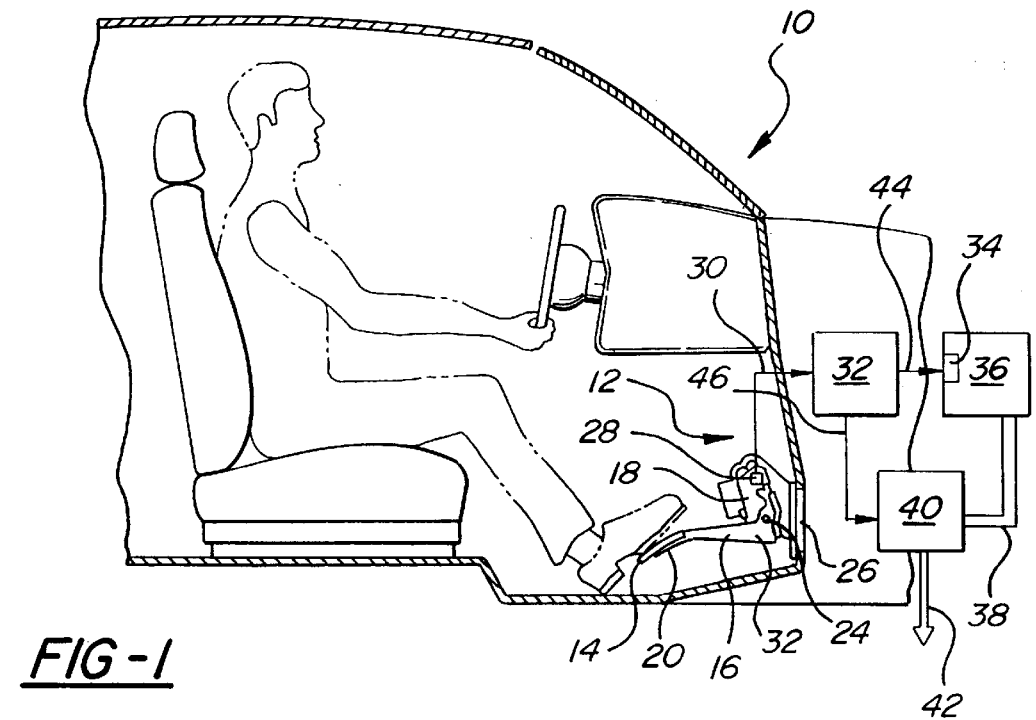
FIG. 1 is a side schematic view of an electronic throttle control system in a vehicle.
Figure 2:
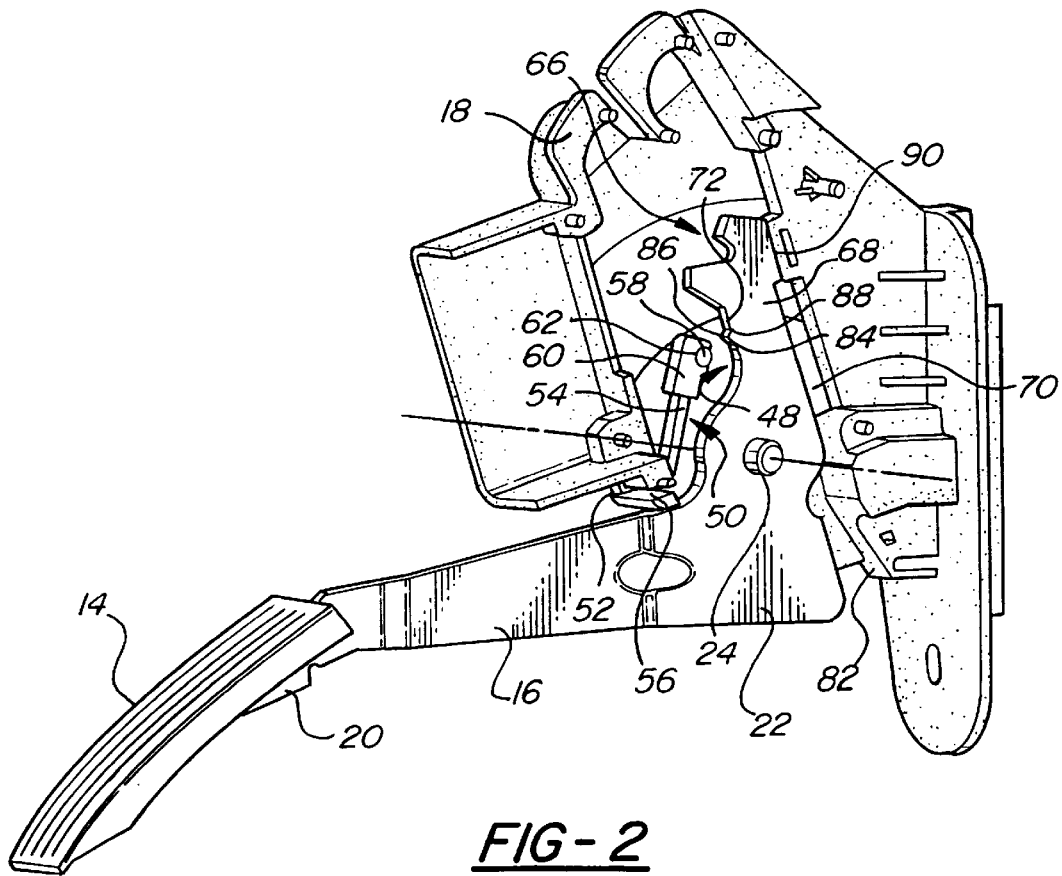
FIG. 2 is a partially broken, perspective view of the subject invention mounted in an accelerator pedal assembly.

The subject invention as shown in FIGS. 1–6 relates to an electronic throttle control accelerator pedal system including a mechanical kickdown to generate a kickdown feel in a drive-by-wire system for a transmission downshift.

Referring to the Figures, wherein like numerals indicate like or corresponding parts throughout the several views, a vehicle 10 incorporating an electronic throttle control (ETC) accelerator pedal assembly is generally shown at 12. The assembly 12 includes an accelerator pedal pad 14, a pedal arm 16, and a housing 18. The accelerator pedal pad 14 is connected to a lower end 20 of the pedal arm 16. An upper end 22 of the pedal arm 16 is pivotally attached to the housing 18 by a pivot shaft or pin 24. The pedal arm 16 is preferably formed from a steel or plastic material and the housing 18 is preferably made from a nylon or plastic material.

The housing 18 is mounted to a vehicle structure 26, such as a vehicle dash, bracket or frame member, by means will known in the art, and houses an electronic throttle control sensor 28. The sensor 28 is typically a potentiometer, however, other sensors known in the art can be used. The sensor 28 is supported by the housing 18 and generates an electric control signal 30 that varies in magnitude in proportion to the extent of movement of the pedal arm 16 relative to the housing 18. The control signal 30 is sent to a computer processor 32 that uses the signal 30 to control a vehicle engine throttle 34. The throttle 34 regulates the amount of fuel that enters a vehicle engine 36. The engine 36 is mechanically connected by a linkage 38 to an automatic transmission 40 that is shiftable between high and low gear positions. The engine 36 supplies varying power to the transmission 40, which controls the magnitude of output speed and torque delivered via an output 42 to the vehicle wheels (not shown).

Ultimately, the output speed and torque are dependent on the control signal 30 that represents the pedal arm 16 position. Once the processor 32 receives the control signal 30 from the pedal sensor 28, the processor generates a second control signal 44 to control the position of the engine throttle 34. These control signals 30, 44 are communicated along wire connections as is known in the art. The accelerator pedal arm 16 is pivotable between an idle position and a maximum travel position. Sometimes the driver will desire a fast acceleration, which will cause the automatic transmission to change to a next lower gear. This causes the automatic transmission 40 to downshift by changing from a high gear position to a next lower gear position. In a mechanical linkage, when the transmission makes this downshift, a certain feel is imparted to the driver's foot via the pedal assembly. This feel is referred to as kickdown. Because there is no mechanical linkage to the pedal assembly 12 in a drive-by-wire system, the pedal assembly 12 of the subject invention includes a kickdown mechanism whereby the kickdown feel is imparted to the driver's foot via the pedal pad 14. Preferably, the kickdown mechanism is activated when the pedal achieves eight percent of full travel, however, other activation points can be utilized.

It should be understood that the actual downshifting of the transmission 40 can be accomplished by any means known in the art, including by electronic or mechanical control. For example, when certain conditions are met, such as when the pedal arm 16 is moved to a certain pre-determined position, the processor 32 could send a signal 46 to the transmission 40 to initiate a downshift. The subject kickdown mechanism would then impart the kickdown feel to the driver.

As discussed above, the pedal arm 16 is pivotable between a plurality of operable positions as the driver applies a pedal force to the pedal pad 14. The pedal arm 14 includes a cam surface 48 that interacts with a resilient member 50. The resilient member 50 includes a first end 52 that is fixed relative to the pedal arm 16 and a movable second end 54 for bias engagement with the pedal arm 16. The resilient member 50 is forced into contact with a portion of the cam surface 48 when the pedal arm 16 is pivoted from a first operable position to a pre-determined second operable position such that the pedal force required to further pivot the pedal arm 16 is increased. This increased pedal force requires the driver to push harder on the pedal pad 14 to further pivot the arm 16. This increased force generates the kickdown feel that is imparted to the driver.

In the preferred embodiment, the resilient member 50 is comprised a spring having one end 52 seated within a notch 56 in the housing 18 with the opposite end 54 connected to a roller 58 for engaging the cam surface 48. A support 60 is preferably mounted to the second end 54 of the spring and has a curved recess or roller-holder 62 that supports the roller 58 as it moves along the cam surface 48. The support 60 can be attached to the spring by any means well known in the art such as by a press-fit or with fasteners, for example.

The upper end 22 of the pedal arm 16 is pivotally mounted to the housing on the pivot shaft 24, which defines an axis of rotation 64 about which the pedal arm 16 pivots when moved between operable positions. The pedal arm 16 further includes a pivot lever 66 that extends upwardly from the upper end 22 of the pedal arm 16. The pivot lever 66 presents the cam surface 48 that interacts with the roller 58 to generate the kickdown feel. The pivot lever 66 includes a main body portion 68 with a forward edge 70 and a rearward edge 72. The main body portion 68 is orientated transversely to the axis of rotation 64 and the rearward edge 72 defines the cam surface 48.

Figure 3:
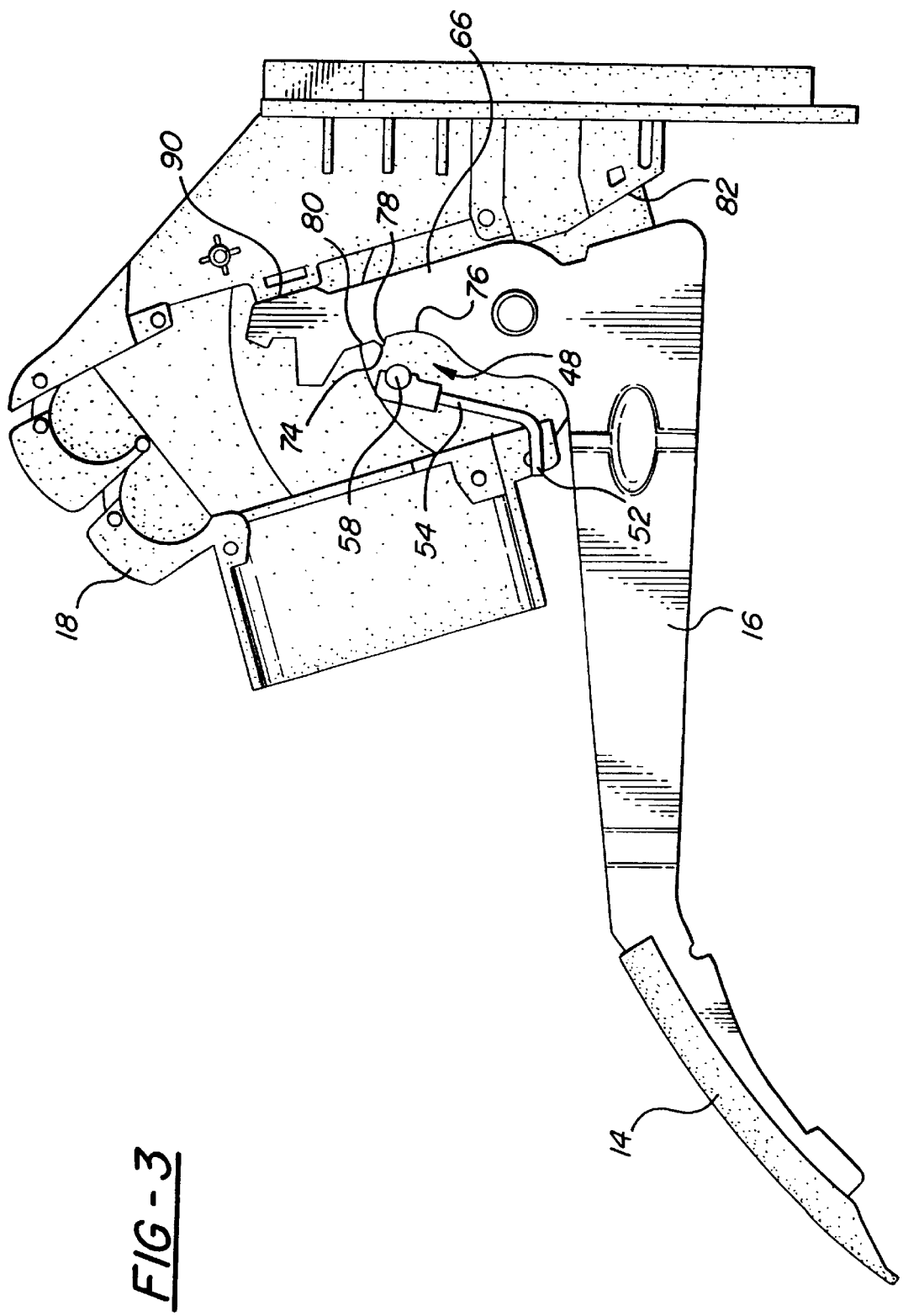
FIG. 3 is a side view of the subject invention when the accelerator pedal is in an idle position.

As shown in FIG. 3, the cam surface 48 includes a lobe 74 extending outwardly from the pivot lever 66. During operation, the pedal arm 16 is initially pivoted from an idle position, shown in FIG. 3, to a first operable position when a first pedal force F1 is applied to the pedal pad 14. The pedal arm 16 can then be pivoted from the first operable position to the second operable position, shown in FIG. 4, when a second pedal force F2 is applied to the pad 14. The second operable position is a pre-determined kickdown position where the transmission 40 is downshifted into the next lower gear position. The pedal arm 16 can also be pivoted from the second operable position to a maximum applied position, shown in FIG. 5, when a third pedal force F3 is applied to the pedal pad 14. In the preferred embodiment, the second pedal force F2 is greater than the first F1 or third F3 pedal force, as shown in FIG. 6. The movement from idle to the first operable position, to the kickdown position, and to the maximum applied position can be accomplished quickly such as when a vehicle makes a fast acceleration from zero (0) miles per hour to sixty (60) or seventy (70) miles per hour or can be accomplished over a longer time period such as when a vehicle accelerates to a low speed and then needs to accelerate quickly to a higher speed. Either way, the driver must increase the pedal application force when the kickdown position is reached to force the roller 58 against the spring bias force for movement over the lobe 74.

Figure 4:
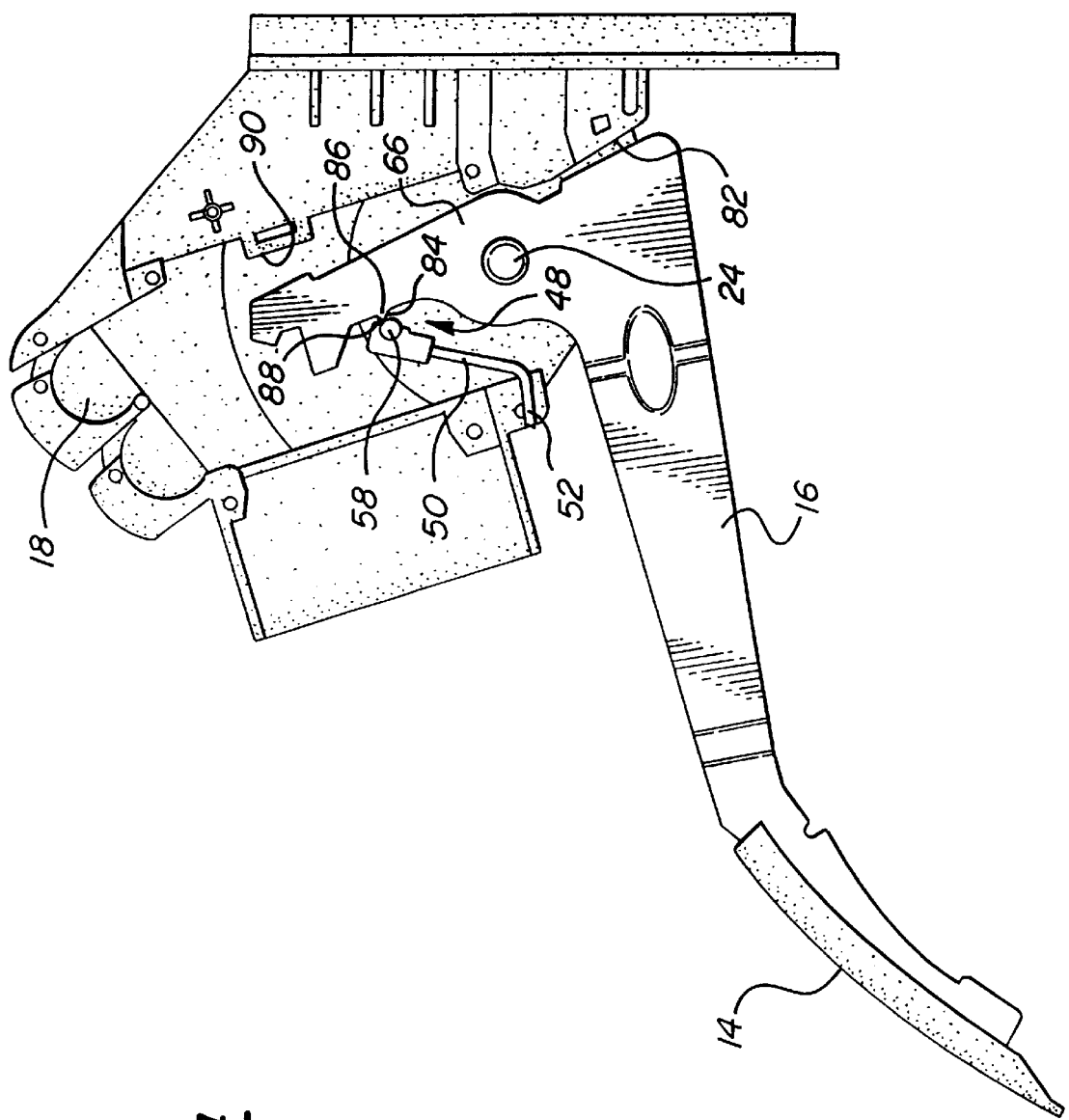
FIG. 4 is a side view of the subject invention when the accelerator pedal is at approximately eighty percent full throttle.
Figure 5:
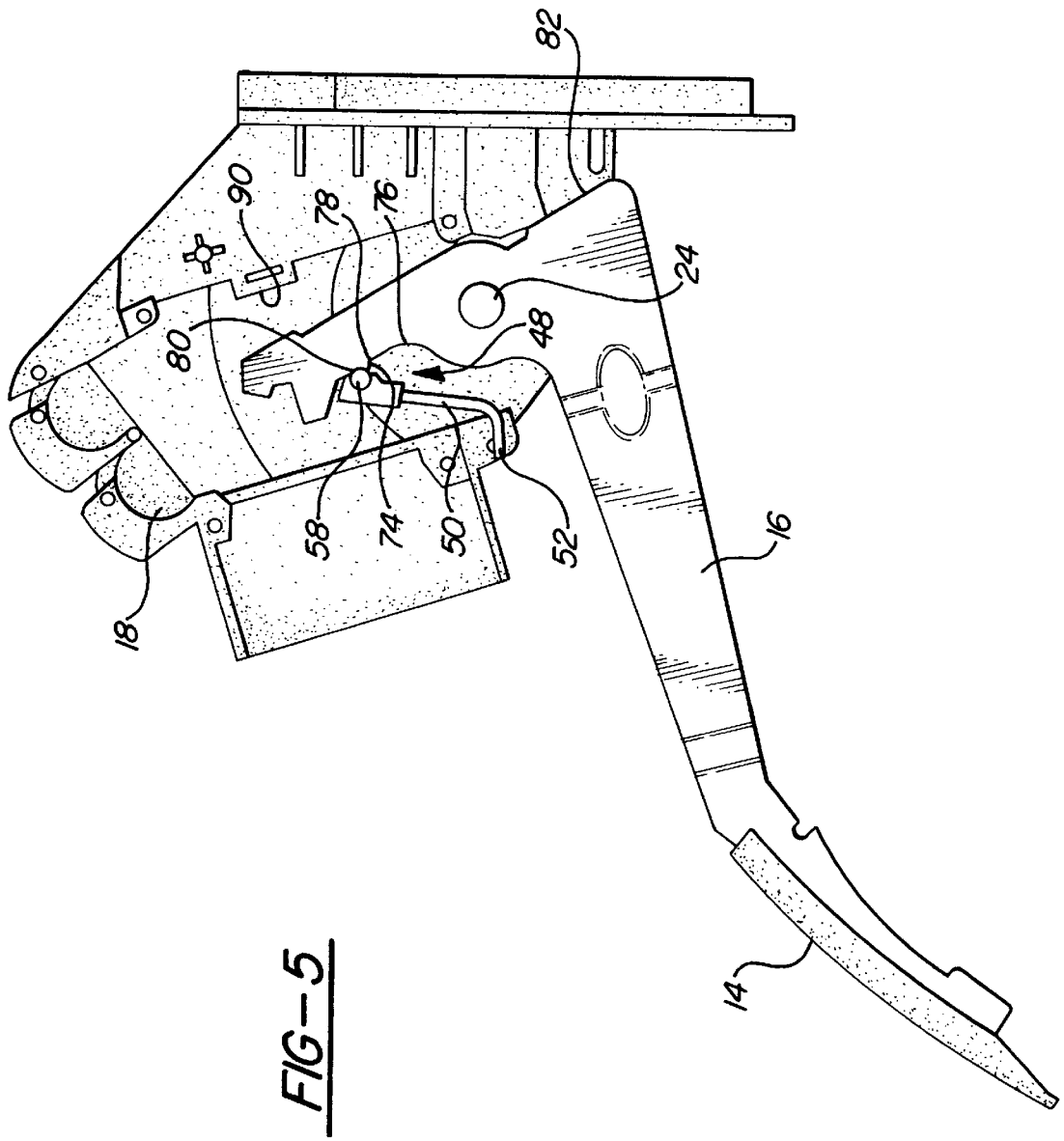
FIG. 5 is a side view of the subject invention when the accelerator pedal is at full throttle.
Figure 6:
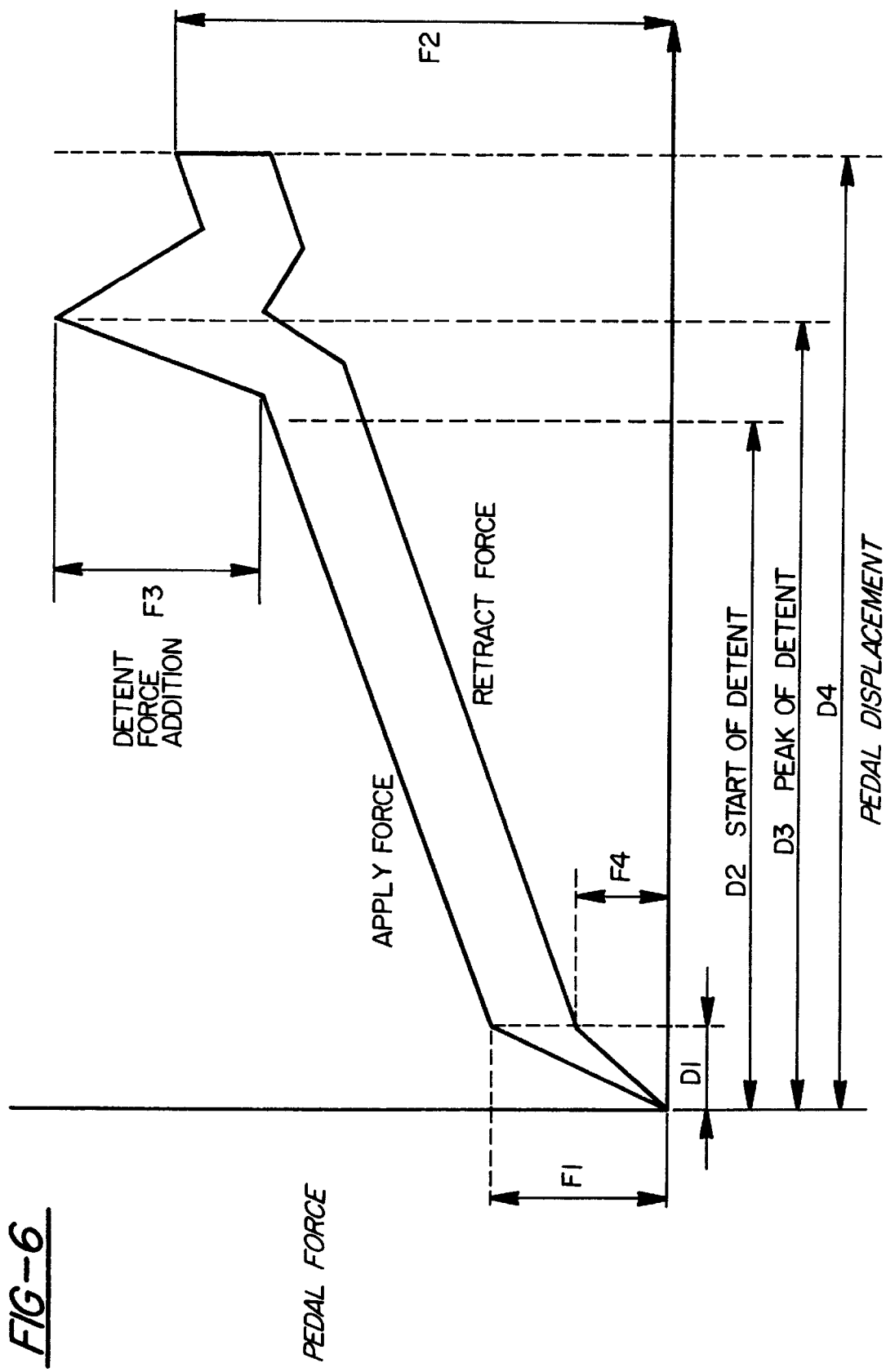
FIG. 6 is a graph showing pedal force vs. pedal displacement for an accelerator pedal utilizing the subject invention.

As shown in FIGS. 3–5, the cam surface 48 is comprised of a first portion 76, a central portion 78 including the lobe 74, and a second portion 80. The roller 58 engages the first portion 76 when the pedal arm 16 is pivoted from the idle position to the first operable position. The roller 58 engages the lobe 74 on the central portion 78 when the pedal arm 16 is pivoted to the kickdown position, shown in FIG. 4. The roller 58 engages the second portion 80 when the pedal arm 16 is pivoted from the kickdown position to the maximum applied position, shown in FIG. 5. The housing 18 includes a stop 82 where the pedal arm 16 bottoms out against the housing 18 to define the maximum applied position. The housing 18 also includes a stop 90 where the pedal arm 16 rests against the housing 18 to define the idle position.

As discussed above, when the pedal arm is moved to the kickdown position, the second pedal force F2 increases as the roller 58 is forced over the lobe 74. This increased force required to move the roller 58 is a force that is felt by the driver through the pedal pad 14 and simulates a transmission shift feel. The third pedal force F3 that is required to pivot the pedal arm 16 from the kickdown position toward the maximum applied position is less than the second pedal force F2 that is required to move the roller 58 over the lobe 74. It should be understood that in some pedal applications, F2 and F3 could remain the same.

The lobe 74 is preferably triangular in shape with a first ramp portion 84 extending outwardly from the rearward edge 72 of the pivot lever 66 toward a tip 86 and a second ramp portion 88 extending outwardly from the rearward edge 72 toward the tip 86. The spring 50 is biased toward the pivot lever 66 such that increased effort is required to bend the spring 50 away from the lever 66. The second pedal force F2 is increased over the first pedal force F1 because the roller 58 must travel up the first ramp portion 84 to the tip 86, i.e., away from the lever 66, as shown in FIG. 4. The third pedal force F3 is decreased with respect to the second pedal force F2 because the spring 50 is traveling down the second ramp portion 88, i.e., toward the lever 66, as shown in FIG 5.

Another feature of the spring 50 shown in FIG. 6, is that the retraction force required to return the pedal arm 16 from the maximum applied position to the idle position is less than the application force required to pivot the pedal arm 16 from the idle position to the maximum applied position. As discussed above, the spring 50 is biased toward the lever arm 66. When the cam surface 48 comes into contact with the roller 58 the spring is forced to bend, i.e., the lever 66 is trying to force the spring 50 away. This imparts a resistance that is felt by the driver. As the pedal arm 16 is moved to the kickdown position the roller is forced further away by an inclined surface 84, which further increases the resistance felt by the driver. When the pedal arm 16 is in the maximum applied position and the pedal force at the pedal pad 14 is lessened, the spring force works to return the spring 50 to its initial state. Thus, the retracting force is less than the application force because the spring is working with the pedal arm 16 instead of against the pedal arm 16, i.e., the spring force is additive during application and subtractive during retraction. A slight increase in force is required to move the roller over the lobe 74 however, because the inclined surface 88 is sloped downwardly the return force is lower than when the spring 50 was forced against the first inclined surface 84. It should be understood that the lobe 74 could be modified for an application where F2 is equal to F3.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An accelerator pedal assembly (12) for electronically controlling a vehicle engine throttle comprising:

a housing (18) for attachment to a vehicle structure (26);

a pedal arm (16) having an upper end (22) pivotally supported with respect to said housing (18) and a lower end (20) for supporting a pedal pad (14), said pedal arm (16) being pivotable between a plurality of operable positions as a pedal force is applied to said pedal pad (14);

a resilient member (50) including a first end (52) fixed relative to said pedal arm (16) and a movable second end (54) for bias engagement with said pedal arm (16), said pedal arm (16) presenting a cam surface (48) for interacting with said resilient member (50) wherein said resilient member (50) is forced into contact with a portion of said cam surface (48) when said pedal arm (16) is pivoted from a first operable position to a predetermined second operable position such that the pedal force required to further pivot said pedal arm (16) is increased, said resilient member (50) including a roller (58) mounted on said second end (54) for engaging said cam surface (48).

2. An assembly as set forth in claim 1 including a support (60) mounted to said second end (54) of said resilient member (50) with a curved recess (62) for supporting said roller (58) as said roller (58) moves along said cam surface (48).

3. An assembly as set forth in claim 1 wherein said upper end (22) of said pedal arm (16) is pivotally mounted to said housing (18) on a pivot shaft (24) defining an axis of rotation (64) about which said pedal arm (16) pivots when moved between operable positions.

4. An assembly as set forth in claim 3 wherein said pedal arm (16) includes a pivot lever (66) extending rearwardly from said upper end (22), said pivot lever (66) presenting said cam surface (48) for interacting with said roller (58).

5. An assembly as set forth in claim 4 wherein said pivot lever (66) includes a main body portion (68) with a forward edge (70) and a rearward edge (72), said main body portion (68) being orientated transversely to said axis of rotation (64) with said rearward edge (72) defining said cam surface (48).

6. An assembly as set forth in claim 4 wherein said cam surface (48) includes a lobe (74) extending outwardly from said pivot lever (66).

7. An assembly as set forth in claim 6 wherein said pedal arm (16) is pivoted from an idle position to said first operable position when a first pedal force is applied to said pedal pad (14), is pivoted from said first operable position to said second operable position when a second pedal force is applied to said pad (14), and is pivoted from said second operable position to a maximum applied position when a third pedal force is applied to said pedal pad (14), said second pedal force being greater than said first or third pedal force.

8. An assembly as set forth in claim 7 wherein said cam surface (48) is comprised of a first portion (76), a central portion (78) including said lobe (74), and a second portion (80) such that said roller (58) engages said first portion (76) when said pedal arm (16) is pivoted from said idle position to said first operable position, engages said lobe (74) when said pedal arm (16) is pivoted to said second operable position, and engages said second portion (80) when said pedal arm (16) is pivoted from said second operable position to said maximum applied position.

9. An assembly as set forth in claim 8 wherein said second operable position is a kickdown position where said second pedal force is increased as said roller (58) is forced over said lobe (74), simulating a transmission shift feel at said pedal pad (14).

10. An assembly as set forth in claim 9 wherein said third pedal force is decreased as said pedal arm (16) is pivoted from said kickdown position to said maximum applied position.

11. An assembly as set forth in claim 10 wherein said housing (18) includes a notch (56) for seating said first end (52) of said resilient member (50).

12. An assembly as set forth in claim 1 including an electronic throttle control sensor (28) supported by said housing (18), said electronic throttle control sensor (28) for generating an electric control signal (30) that varies in magnitude in proportion to the extent of movement of said pedal arm (16) relative to said housing (18).

13. An assembly as set forth in claim 12 wherein said resilient member (50) is comprised of a spring having one end (52) seated within said housing (18) and an opposite end (54) connected to a roller (58) for engaging said cam surface (48) as said pedal arm (16) is moved from an idle position to a maximum applied position.

14. An assembly as set forth in claim 13 wherein said pedal arm (16) is pivoted from said idle position to said first operable position when a first pedal force is applied to said pedal pad (14), is pivoted from said first operable position to said kickdown position when a second pedal force is applied to said pad (14), and is pivoted from said kickdown position to said maximum applied position when a third pedal force is applied to said pedal pad (14), said second pedal force being greater than said first or third pedal force.

15. An assembly as set forth in claim 14 wherein said cam surface (48) is comprised of a first portion (76), a central portion (78) having a lobe (74) extending outwardly from said surface (48), and a second portion (80) wherein said roller (58) engages said first portion (76) when said pedal arm (16) is pivoted from said idle position to said first operable position, engages said lobe (74) when said pedal arm (16) is in said kickdown position, and engages said second portion (80) when said pedal arm (16) is pivoted from said kickdown position to said maximum applied position such that said second pedal force is increased as said roller (58) is forced over said lobe (74) to simulate a transmission shift feel at said pedal pad (14) as said transmission (40) shifts from a high gear position to a low gear position.

16. An accelerator pedal assembly (12) for electronically controlling a vehicle engine throttle comprising:

a housing (18) for attachment to a vehicle structure (26);

a pedal arm (16) having an upper end (22) pivotally supported with respect to said housing (18) and a lower end (20) for supporting a pedal pad (14), said pedal arm (16) being pivotable between a plurality of operable positions as a pedal force is applied to said pedal pad (14);

a resilient member (50) that engages a portion of said pedal arm (16) when said pedal arm (16) is pivoted from a first operable position to a pre-determined second operable position such that the pedal force required to further pivot said pedal arm (16) is increased, said pedal arm (16) presenting a cam surface (48) for interacting with said resilient member (50), said resilient member including a first end (52) fixed relative to said pedal arm (16) and a movable second end (54) for bias engagement with said pedal arm (16) wherein said resilient member (50) is forced into contact with a portion of said cam surface (48) when said pedal arm (16) is pivoted from said first operable position to said predetermined second operable position, an electronic throttle control sensor (28) supported by said housing (18) for generating an electric control signal (30) that varies in magnitude in proportion to the extend of movement of said pedal arm (16) relative to said housing (18) and wherein said resilient member (50) includes a roller (58) mounted on said second end (54) for engaging said cam surface (48).

17. An accelerator pedal assembly (12) for electronically controlling a vehicle engine throttle comprising:

a housing (18) for attachment to a vehicle structure (26);

a pedal arm (16) having an upper end (22) pivotally supported with respect to said housing (18) and a lower end (20) for supporting a pedal pad (14), said pedal arm (16) being pivotable between a plurality of operable positions as a pedal force is applied to said pedal pad (14);

a resilient member (50) including a first end (52) fixed relative to said pedal arm (16) and a movable second end (54) for bias engagement with said pedal arm (16) said pedal arm (16) presenting a cam surface (48) for interacting with a resilient member (50) wherein said resilient member (50) is forced into contact with a portion of said cam surface (48) when said pedal arm (16) is pivoted from an idle position to a first operable position when a first pedal force is applied to said pedal pad (14) and is pivoted from said first operable position to said second operable position when a second pedal force is applied to said pad (14) and is pivoted from said second operable position to a maximum applied position when a third pedal force is applied to said pedal pad (14) with said second pedal force being greater than said first or third pedal force.

18. An assembly as set forth in claim 17 wherein said cam surface (48) comprises a first portion (76), a central portion (78) and a second portion (80) such that said resilient member (50) engages said first portion (76) when said pedal arm (16) is pivoted to said first operable position, engages said lobe (74) when said pedal arm (16) is pivoted to said second operable position, and engages said second portion (80) when said pedal arm (16) is pivoted from said second operable position to said maximum applied position.

19. An assembly as set forth in claim 18 wherein said cam surface (48) includes a lobe (74) extending outwardly from said pivot lever (66) and said second operable position is a kickdown position where said second pedal force is increased as said resilient member (50) is forced over said lobe (74), simulating a transmission shift feel at said pedal pad (14).

20. An assembly as set forth in claim 19 wherein said third pedal force is decreased as said pedal arm (16) is pivoted from said kickdown position to said maximum applied position.

* * * * *